United States Patent [19]

Caruel et al.

[11] 4,162,611

[45] Jul. 31, 1979

[54] COMBUSTION CHAMBER FOR TURBO ENGINES

[75] Inventors: Jacques E. J. Caruel, Dammarie les Lys; Jean R. Bédué, Creteil; Bruno Deroide, Montgeron la Foret; Jean-Paul R. Gaillac, Combs la Ville; Philippe M. D. Gastebois, Melun, all of France

[73] Assignee: Societe Nationale d'Etude et de Construction de Moteurs d'Aviation, Paris, France

[21] Appl. No.: 812,636

[22] Filed: Jul. 5, 1977

[30] Foreign Application Priority Data

Jul. 7, 1976 [FR] France .............................. 76 20707
May 18, 1977 [FR] France .............................. 77 16071

[51] Int. Cl.² .............................................. F02C 7/22
[52] U.S. Cl. ................................. 60/39.65; 431/352; 431/353
[58] Field of Search ............... 60/39.65, 39.06; 431/10, 351-353

[56] References Cited

U.S. PATENT DOCUMENTS

| 3,820,324 | 6/1974 | Grindley et al. ............. 60/39.65 |
| 3,906,718 | 9/1975 | Wood ............................. 60/39.65 |
| 3,916,619 | 11/1975 | Masai et al. .................. 60/39.65 |
| 3,934,409 | 1/1976 | Quillevere et al. ........... 60/39.65 |

Primary Examiner—Robert E. Garrett
Attorney, Agent, or Firm—Bacon & Thomas

[57] ABSTRACT

A fuel injection nozzle for a turbo engine is mounted at the base of a combustion chamber, either tubular or annular, by means of an intermediate inwardly flared member having openings through its sides for admitting cooling air. An annular flange structure around the intermediate member supports the same and defines an annular space with the base of the chamber for a layer of cooling air admitted to that space through holes in the base. Several forms are disclosed in each of which the various holes and air inlets are dimensioned and positioned to provide a stoichiometric mixture of air and fuel under substantially all conditions of operation.

24 Claims, 11 Drawing Figures

COMBUSTION CHAMBER FOR TURBO ENGINES

BACKGROUND OF THE INVENTION

Concerns for environmental protection have led designers of aviation turbo engines to search for means to reduce the proportion of pollutants in the exhaust gases of the engines. It is known that the principal problems in the matter of pollution of aviation turbo engines are, on the one hand, the emission of carbon monoxide, of hydrocarbons, and of various unburnt residues during operation on the ground and, on the other hand, the emission of nitrogen oxides and of particles during take-off and during cruising at altitude.

Conventional combustion chambers are generally of optimized rating for take-off or near take-off operation. This signifies that, in the primary zone of the combustion chamber, a fraction of the air flow of the compressor is introduced so that, with the injected fuel, the fuel-air mixture in this zone would be essentially stoichiometric in these modes. Under these conditions, due to the levels of temperature and high pressures, as complete as possible a combustion is obtained, combustion yields greater than 0.99 are attained, the speeds of the chemical reaction being optimum for these stoichimoetric mixtures.

In contrast, at low ratings, at idle or nearly so, the total richness in the chamber is only about half that at take-off; in addition, the pressures and temperatures at the outlet of the compressor are lower; the result is that the chamber, with the partial charge is very much maladjusted and that the slow speed combustion efficiency rarely goes beyond 0.93. The combustion is, therefore, very incomplete, which means much higher concentrations of carbon monoxide and unburnt residues at the exhaust than under normal operation. The proportions of the pollutants are all the higher, the lower the total yield of the combustion.

However, it appears to be possible to improve the performance of a combustion chamber by acting on four factors:
The timing of vaporization of the fuel,
the timing of the air-fuel mixture,
the timing of the fresh gas/burnt gas mixture,
the timing of the chemical reaction.

The first two times can be considered negligible at high ratings because of the pressures which are attained, but it is not so at low ratings. In fact, in order to increase the speed of the vaporization of the fuel, it must be transformed into fine droplets, which, in normal operation, is easily realized by the conventional mechanical atomizing injector, but the performance which is obtained in the lower ratings is poor. This is due to the fact that, if the fuel is well divided into droplets, these are poorly mixed with air in the primary zone and local zones would appear which have a richness which is too high. In the end, it would be necessary that each droplet would have around it the quantity of gas necessary for its vaporization and for its combustion, i.e., a quantity of gas which results in a stoichiometric mixture with the oxygen molecules after complete varporization. In order to accomplish this, systems such as aerodynamic injection have been proposed. Aerodynamic type injectors generally comprise whirling, or swirler vanes through which the air from the compressor is introduced, which serves to atomize the fuel. An air/fuel pre-mixture is thus obtained. The detailed operation and the realization of a certain number of injectors of this type are described in French Pat. Nos. 72.25840, 72.40166 and the application for the certificate of addition to the latter 73.38253, in the name of the applicant.

Another solution which can also be used is pre-atomization in which an air/fuel mixture is injected against the flow through the intermediate part of a T-shaped can. These systems are described, for example, in the French Pat. No. 71.05753 and in the French patent application No. 72.22811 in the name of the applicant.

The fresh gas/burnt gas mixture must also be advantageous because it contributes to the increase in the temperature of the carburized mixture and, therefore, aids in its atomization and consequently permits an improvement in the speed of the chemical reaction. In conventionally allowing this contact of the carburized mixture with the high temperature gas from the combustion it is desirable to arrange for a recirculation of the latter by searching for a convenient turbulence level.

All of these solutions, which allow an improvement in the combustion yield have, however, a maximum efficiency only for values sufficient for the pressures and temperatures of the air at the chamber inlet.

As far as the reaction time is concerned, it is necessary to additionally reserach an optimization of the richness of the mixture, the ideal would be to be able to obtain a stoichiometric air/fuel proportion in the flame stabilization zone, regardless of the operation of the engine. One such approach is, for example, the double chamber described in the French patent application No. 73.-8819 in the name of the applicant; this chamber is comprised of two annular concentric combustion zones, of which one is adapted for slow operation. However, this type of chamber has a considerable technological complexity, which increases its manufacturing cost, its installation is delicate, and furthermore, its weight is greater. See also U.S. Pat. No. 3,088,279.

SUMMARY OF THE INVENTION

A first objective of this invention is to provide a novel solution to the problem of low operating combustion for a chamber which includes aerodynamic type or pre-atomization injectors, which are mounted in the base of the chamber. In fact, in the case of a conventional chamber of this type, which is arranged to provide a stoichiometric mixture at take-off, about one-third of the air flow necessary for the combustion is introduced in the injection system, and two-thirds by the primary orifices.

Thus, under slow conditions, the mixture is about 1.5 times stoichiometric if only the air of the injection system is taken into account, and 0.5 times stoichiometric if all of the primary air is taken into consideration. This means to say that the ideal mixture is not present in any zone, and the primary jets then act rather as a dilution.

In accordance with this invention, an intermediate segment with dimensions which are reduced in comparison with the chamber, defining a volume which expands in the direction of the gas flow, between each injector, or group of injectors, and the base of the chamber. A flow of air D3, which is taken from the flow of air D1 of the conventional chamber primary orifices is introduced into the intermediate segment or the assembly of the intermediate setments in order to preserve the adaptation of the chamber at high operation. This flow D3, added to the flow D2, which comes in through the injection system, forms an essentially stoichiometric proportion with the injected fuel at low speed in this primary mini-zone. The flow which is to be introduced through the primary orifices will, therefore, not be more than D'1=D1−D3, and the diameters of the primary holes should be reduced in comparison with a conventional chamber. It is understood that at take-off or approaching operation, the mixture of primary air (that is to say, the air which participates in the atomization of the fuel, flow D2, the air coming in through the holes of the intermediate segment, flow D3, and that coming in through the primary holes, flow D'1) with the fuel is stoichiometric. The air flow D3 is introduced into the intermediate segment through a large number of small diameter holes, thus in the form of highly penetrating jets, which brings about a high level of turbulence in the primary mini-zone. The homogenization of the mixture is thus improved, which reduces the production of soot and uncombusted hydrocarbons.

In addition, the described arrangement allows a more progressive injection of the primary air, regardless of the utilization operation, the trend is towards an adaptation of the chamber to all operations.

All of these factors are advantageous for a reduction of the reaction times and could lead to a reduction of the length of the combustion chamber and thus to a limitation of the dwell time of the gases in the latter.

One supplementary effect of the injection of flow D3 in the form of high speed discrete jets is to insure the atomization of a large part of the fuel, which could flow onto the wall of the intermediate segment and could thus reach the walls of the chamber itself, where it would be enclosed by cooling films without being able to participate in the combustion. An improvement in the yield thus results.

The intermediate segment has two definite objectives:
   act on the composition of the mixture and create a primary mini-zone for slow operation;
   complete the role of penumatic injector regardless of the operation.

As far as flow D3 is concerned, it could vary between 1/6 and ⅓ of the total flow of the primary air, an equal division between D'1, D2 and D3 gives very good results; the number and the diameter of the perforations in the primary mini-zone are then determined, the latter, however, being such that the ratio between the maximum dimension of the intermediate sector, measured on a radius of the chamber, and the diameter of the perforations would be between 10 and 40.

As far as the realization of the intermediate segment is concerned, several solutions can be foreseen, as a function of the type of combustion chamber.

One solution which is adaptable to all cases is to provide an actual intermediate segment for each injector which should then be in the form of a volume having an axis of symmetry common with that of the injector and generated by a convenient curve. The simplest solution, from the point of view of its realization, is to provide each injector with an intermediate segment in the shape of a truncated cone; the angle at its top being selected between 60° and 100°, preferably close to the latter value, the holes which are designed for the injection of the fourth flow of air being located as far as possible downstream and being distributed over one or several circles which are located in one or several planes which are perpendicular to the axis of the cone.

In another embodiment, each injector is provided with an intermediate segment, which is formed of two truncated conic portions on a common axis, which is common with that of the injector, welded end to end, and of which the angles at the top cross towards downstream, the small diameter holes which permit the injection of the fourth air flow being in this case located immediately upstream of the unction between the two conical portions, i.e. at the downstream end of the conical portions of which the top angle is smallest, and distributed over one or several circles located in one or several planes which are perpendicular to the axis of the conical portions.

In an embodiment which is more particularly adapted to high performance combustion chambers, which are strongly thermally acted upon, each injector is provided with an intermediate segment which is formed of a first flaring portion with a common axis with that of the injector, which is generated by a conveniently profiled curve, at the downstream end of which, joined by its smallest diameter, a crown is located in a plane which is perpendicular to the axis of the injector. The holes which are designed for the injection of the fourth flow of air will thus be located in the crown with their axes perpendicular to the plane which is tangent to the downstream end of the flared segment. As an example, the flared segment can be a truncated cone, with an angle at the top between 60° and 100°, the holes which are designed for the injection of the fourth flow of air are located in the crown and are distributed over one or several circles which are coaxial with it, the axis of each of the holes being normal to the generator of the truncated cone-shaped segment. This arrangement has the advantage of eliminating the risks of burns which can result from the existence of hot slipstreams behind the air jets which correspond to the fourth flow.

In the case of highly charged chambers, for which the risk of burns of the downstream end of the intermediate segment is greater, another solution consists of boring holes, which are designed for the introduction of a fith flow of air, in the immediate vicinity of the joint between the intermediate segment and the base of the chamber. The number of these orifices is preferably at least equal to that of the holes which are designed for the introduction of the fourth flow of air and arranged in such a manner as to cool the most stressed zones. The fifth flow of air should represent for the injector, or the entity of injectors, 1/5 to 1/10 of the primary air flow, the axes of the orifices, which are designed for its ontroduction, are preferably parallel with the plane which is tangent with the downstream end of the intermediate segment, or make an angle of at most 10° with it. It should be noted that this fifth flow of air, like the fourth, will participate in the atomization of the fuel which is susceptible of running down over the walls of the intermediate segment. This fifth flow should also have a favorable effect on the turbulence at the base of the chamber and will participate in the improvement of the stability of the combustion.

A second objective of this invention is to provide an improvement which is supplementary to the results obtained with an intermediate segment having reduced dimensions, by having it penetrate inside the chamber. This procedure permits the arrangement, between the exterior surface of the walls of the intermediate segment and the walls of the combustion chamber itself, a recirculation zone of considerable volume. It has been found preferable to let the intermediate segment penetrate to a depth which is between one-fifth and one-half of its maximum dimension, measured on a radius of the chamber. The modification which is thus provided to the passages of the different gas flows, air, burnt gas and fresh carburized mixture, permits the improvement of the dwell time of the gases in combustion in the secondary recirculation zone which is thus defined. An improvement of the stability of the combustion in a partial vacuum thus results.

As far as the chambers of the annular, or nozzle-shaped type are concerned, it is possible to design the intermediate segment in the form of an annular zone which is common to all the injectors. The intermediate segment would then be formed of a circular base located in a plane which is perpendicular to the axis of the chamber to which the injectors are attached, and of two annular lateral walls which are welded, at the one end, to the circular base and on the other end to the base of the chamber, defining an annular volume which flares towards downstream, various forms could be adapted for the lateral walls, in a manner analogous to the case of the intermediate segment itself to each injector. They could each particularly be generated by a straight line and then each form a conic wall at the downstream end on which the holes, which are designed for the introduction of the fourth flow of air are located, distributed over one or several circles which are located on one or several planes which are perpendicular to the axis of the chamber. Each of the lateral walls could be formed of two truncated conical sections, with the connecting axes welded end to end, of which the angles at the top increase towards downstream, the small diameter holes which are designed for the injection of the fourth air flow being located immediately ahead of the joint which is formed by the joining of the two truncated cones, and distributed over one or several planes which are perpendicular to the common axis of the truncated cones. They could also be formed of a first truncated portion, with a top angle between 60° and 100°, comprising, at its downstream end, an annular zone which is located in a plane which is perpendicular to the axis of the chamber, in which the small diameter holes are drilled, which are designed for the injection of the fourth air flow, the holes being distributed over one or several circles which are coaxial with the said zone and having their axis normal to the generators of the truncated portion, to which an annular zone is joined where they are drilled. This last arrangement proves to be particularly advantageous in the case of a high performance chamber because of the fact that it suppresses the hot slip-streams behind the jets which correspond to the fourth flow.

The diameter of the holes, which are designed for the injection of the fourth flow, in the intermediate annular segment, which will represent 1/6 to ⅓ of the primary air, will have a diameter between 1/10 and 1/40 of the maximum dimension of the flared segment, measured on a radius of the chamber.

The cooling of the downstream ends of each lateral wall by a fifth air flow obviously works, the holes which are designed for the injection of this fifth flow being located in the immediate proximity of the joint between each lateral wall and the chamber, the values of the angles and the flow being identical to that mentioned in the case of the chambers for which each injector possesses its own intermediate segment.

The penetration of the intermediate segment could also be realized in order to increase the volume of the secondary recirculation zone; its depth of penetration will then be between one-fifth and one-half of the maximum dimension of the intermediate segment, measured on a radius of the chamber.

BRIEF DESCRIPTION OF THE DRAWINGS

With reference to the attached figures, the following description illustrates, as examples, some embodiments of the apparatus in accordance with this invention.

DESCRIPTION OF THE PREFERRED EMBODIMENTS

It is, of course, understood that the various sectional views can as well apply to tubular type chambers, as to those of annular or injection tube type, the scale and the placement of the section changing in accordance with the particular application.

Figure 1A:
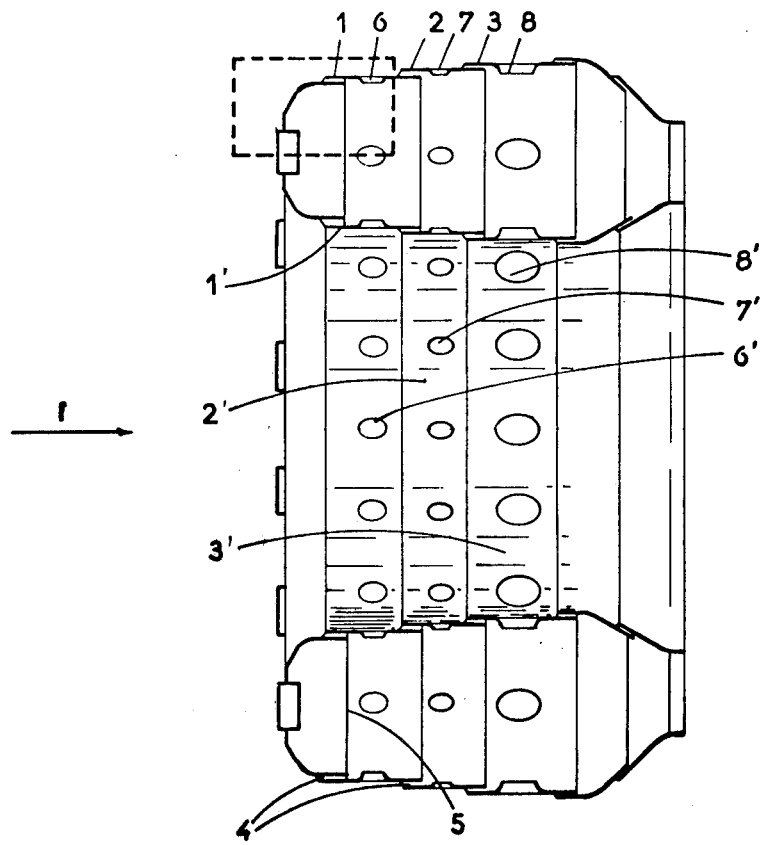
FIG. 1a schematically represents a combustion chamber of the annular type.

The annular chamber of FIG. 1a is formed, in a known manner, of exterior sheet steel sleeves, 1, 2, 3, with the diameter increasing towards downstream, and interior sleeves 1', 2', 3' with a decreasing diameter towards downstream, with respect to the direction of the flow of the gases f which come from the compressor.

The sleeves overlap, providing between them passages 4 (FIG. 1b), letting the air enter which forms a film for the cooling of the walls, such an embodiment is described, for example, in French Pat. No. 71.36330, in the name of the applicant.

From upstream towards downstream, the chamber comprises the primary zone 5 in which the combustion reactions take place. The air flow D1, which is called the primary, and which is ecessary for the combustion is injected into this zone through holes 6 and 6' which are drilled in the periphery of sleeves 1 and 1', respectively. The corresponding zones in sleeves 2, 2', and 3, 3' are called diluting zones, air, called dilution air, is here injected through holes 7, 7' and 8, 8' drilled in their peripheries in order to mix with the hot gases which come from the primary zone to insure their oxidation and to lower their temperature before entering into the turbine.

Figure 1B:
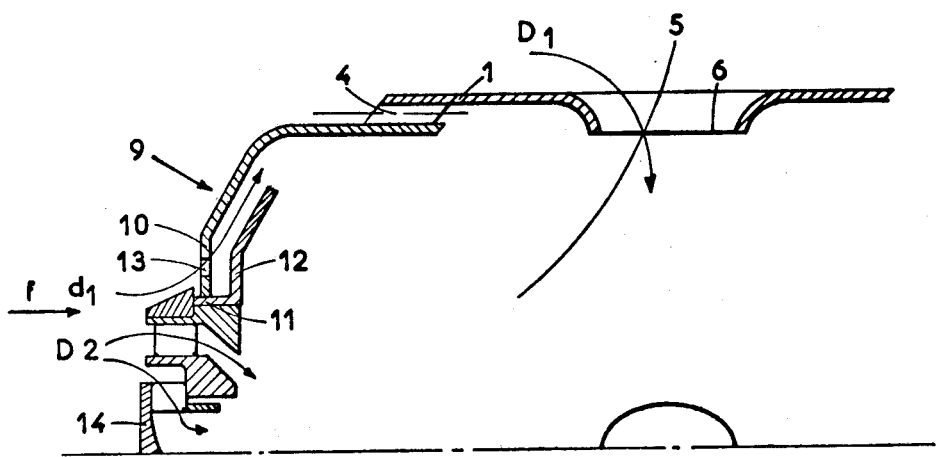
FIG. 1b is an enlarged sectional view of the portion of the chamber of FIG. 1a corresponding to the section in the rectangle, and represents the base of the chamber with the injector mounted in accordance with the prior art.

FIG. 1b represents the upstream end of a conventional combustion chamber. This figure corresponds to the outlined rectangular segment of FIG. 1a at a different scale, it can also be considered as being the section through a plane of symmetry of the injector of the base of a tubular type chamber.

In order to simplify the description, let us assume that we are in the latter case of the illustration.

The base 9 of the chamber comprises an annular portion 10 which is located in a plane perpendicular to the axis of the chamber, and to which a cylindrical sleeve (11) is fastened, having an annular plate 12, the entity comprising, with part 10, an annular area in which a flow D1 of cooling air circulates, which comes in through holes 13 of part 10; this air forms a cooling film for the base of the chamber.

An aerodynamic type injector 14, comprising swirling ribs (swirlers) is mounted on the inside of the sleeve 11, an air flow D2 is injected in it in order to atomize the fuel, by creating a considerable turbulence.

In the case of an annular chamber, a certain number of injectors, such as 14, would be distributed over the base of the chamber and mounted in the same manner by a sleeve 11.

Let us now consider FIG. 2, which represents a chamber in accordance with this invention, the description will first be given for the case of a tubular chamber in connection with FIG. 3. It is found that the injector 14 is no longer mounted directly on the base of the chamber through the intermediate of a sleeve such as 11. An intermediate section 15 in the shape of a truncated cone is interposed between it and the base of the chamber. The injector 14 is attached to the small diameter upstream portion of said part 15. Part 15 combines with the base of the chamber, by its flared downstream end, through the interposition of a sleeve 11, comprising an annular plate 12, which cooperates with the base of the chamber in order to form a cooling air film with the air (flow D1), which is introduced by holes 13 which are drilled in the base of the chamber.

The intermediate part 15 is drilled at its downstream end with small diameter holes 16, which have a regular distribution with a slight pitch, in a plane which is perpendicular to the axis of the chamber. The ratio of the diameter of these holes to the maximum diameter of the truncated cone segment is between 1/10 and 1/40. Holes 16 can be distributed in one or several rows and arranged in an alternating manner from one row to the other. Taking their diameter into consideration, the number of these holes 16 is such that the flow of air D3, which penetrates through them in the form of jets, represents 1/6 to $\frac{1}{3}$ of the primary air. On the other hand, this flow is determined in such a manner that the fuel-/air mixture (flows D2+D3) will be stoichiometric in the intermediate zone at low operation. In order to preserve the adaptation of the chamber to its normal operation, the injection of flow D3 involves the necessity for reducing the quantity of air which is introduced through holes 6 of the primary zone. These, which are referenced 6a in FIGS. 2 and 3, have their number of their diameter reduced in such a manner that the flow which is introduced through the primary holes will be D'1=D1−D3. The primary air is comprised of the sum D'1+D2+D3. Good results have been obtained by an equal division between the flows D'1, D2, and D3. The value of the angle at the top of the truncated cone section is selected between 60° and 100°, preferably near this latter value.

Figure 4:
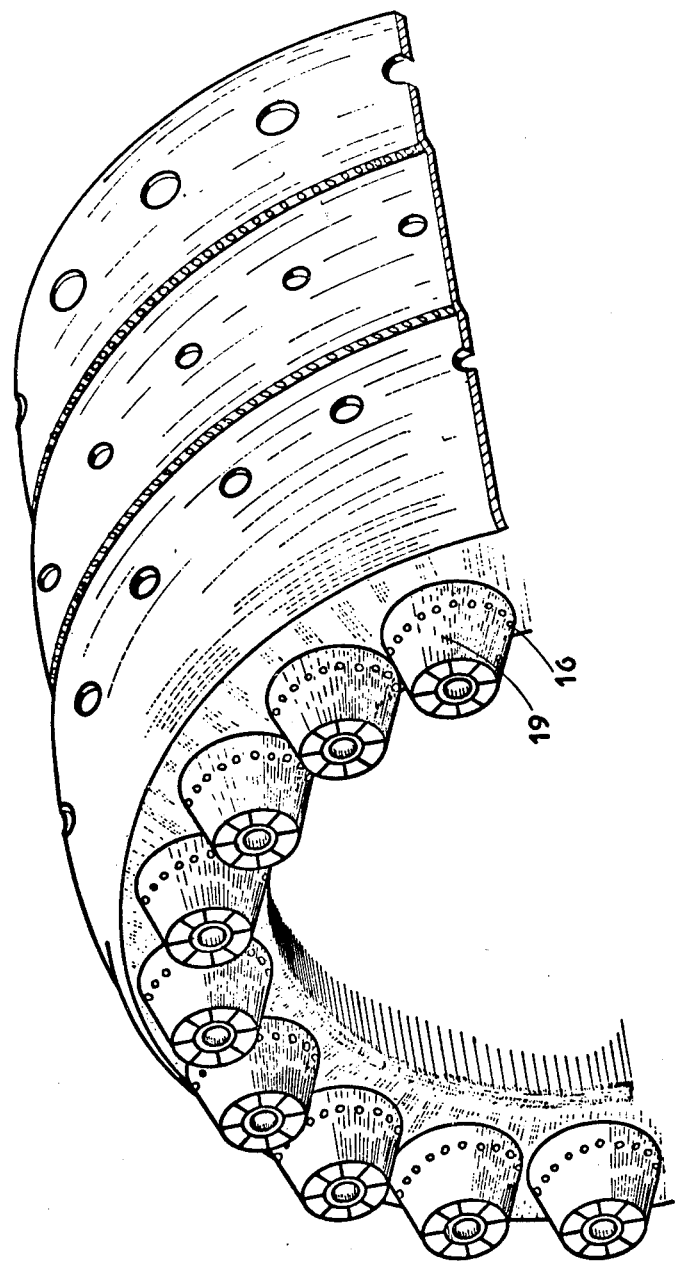
FIG. 4 is a fragmentary perspective view of an annular chamber in which each injector is mounted on an intermediate segment conforming to FIG. 2.

As far as chambers of the annular or nozzle type are concerned, the same arrangement could be adopted for each injector, as is illustrated in FIG. 4. The detailed description of the embodiment should, however, be identical to that which precedes at the level of each injector.

For a number N of injectors, a flow D3 is injected in each intermediate segment in such a manner as to have, in each of them, a stoichiometric mixture at low operation with the fuel and the flow D2 which is introduced by the injector. The flow ND3 represents $\frac{1}{3}$ to 1/6 of the primary air injected, namely ND3+ND2+D'1, if D'1 is the flow of air which is injected by the primary holes.

Figure 5:
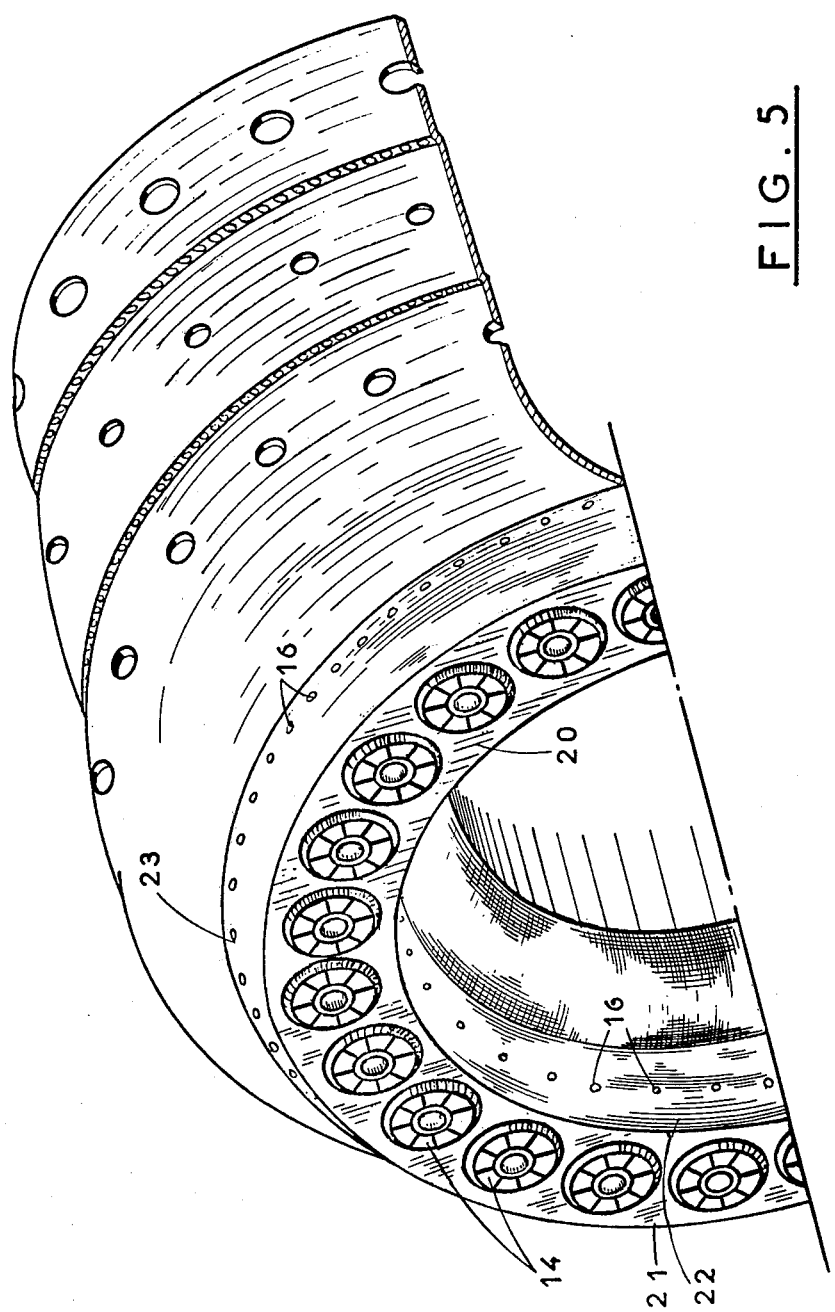
FIG. 5 is a fragmentary perspective view of an annular chamber in which the intermediate segment is common to all injectors and is embodied in the form of an annular zone.

Another manner of realizing the invention in the case of the application to an annular chamber is schematically illustrated in FIG. 5. The intermediate segments of each injector are in this case combined into one single annular intermediate segment. The intermediate zone is formed of a base 20, which is located in a plane perpendicular to the axis of the chamber, on which the injectors 14 are mounted, and of two truncated cone shaped lateral walls 22 and 23, which define a space which, while flaring, goes towards downstream, and of which the downstream ends are connected at the base of the chamber. The manner of fastening the downstream ends to the base of the chamber is identical to that described in the case of the truncated cone shaped intermediate segments which are unique for each injector and will be better understood by referring to FIG. 2.

The truncated cone shaped wall with the greatest diameter is attached to a first annular sleeve having on its extremity an annular plate which is located in a plane perpendicular to the axis of the chamber, cooperating with its base in order to form a space in which the cooling air is introduced; the inside truncated cone shaped wall is fastened to a second sleeve, also having at its downstream end an annular plate which is located in a plane perpendicular to the axis of the chamber and cooperates with the base of the chamber in order to form a second annular space in which cooling air is introduced.

Each lateral wall is drilled at its downstream end with holes 16, which are designed for the introduction of flow D3, allowing the formation of a stoichiometric mixture in the intermediate zone at low operation.

This type of embodiment would also be suitable in the cases of chambers in which the injection of the fuel is carried out by injectors of the preatomization type, injecting against the flow.

The truncated cone shaped lateral walls of the primary minizone flare towards downstream in a manner which is essentially symmetrical with respect to a parallel to the axis of the chamber, and they are embodied in such a manner that their angle at the top is between 60° and 100°. The diameter of holes 16 shall be between 1/10 and 1/40 of the maximum dimension of the truncated cone shaped segment, measured on a radius of the chamber, their number being determined by the value of flow D3.

Figure 6:
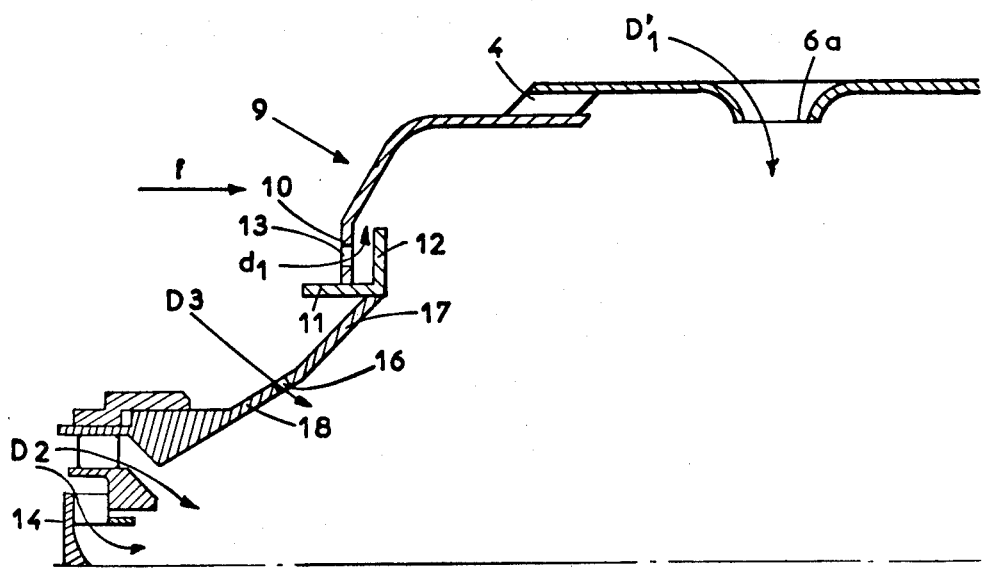
FIG. 6 is a view which is analogous to FIG. 2, showing a chamber modified in accordance with this invention, and for which the intermediate segment of each injector is formed of two truncated cones which are welded end to end.

Another embodiment of the intermediate segment in accordance with this invention is illustrated in FIG. 6.

Figure 2:
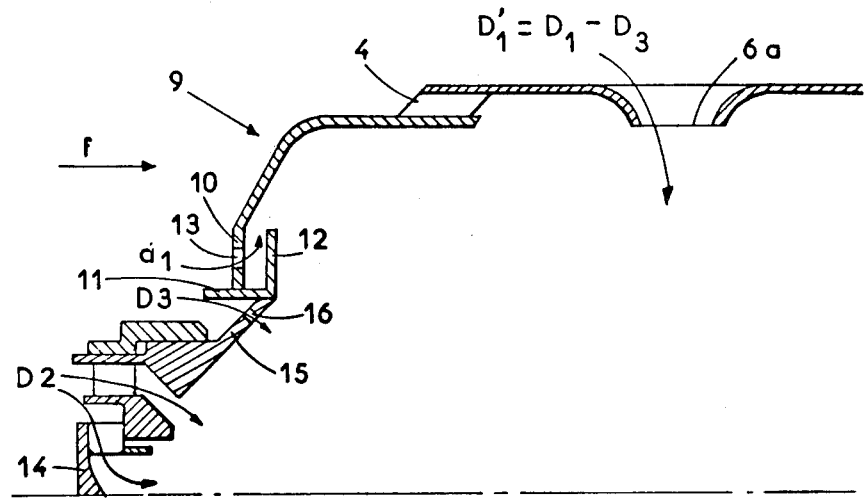
FIG. 2 is a view which is analogous to FIG. 1b, showing a chamber modified in accordance with this invention and for which the intermediate segment of each injector is of truncated shape.
Figure 3:
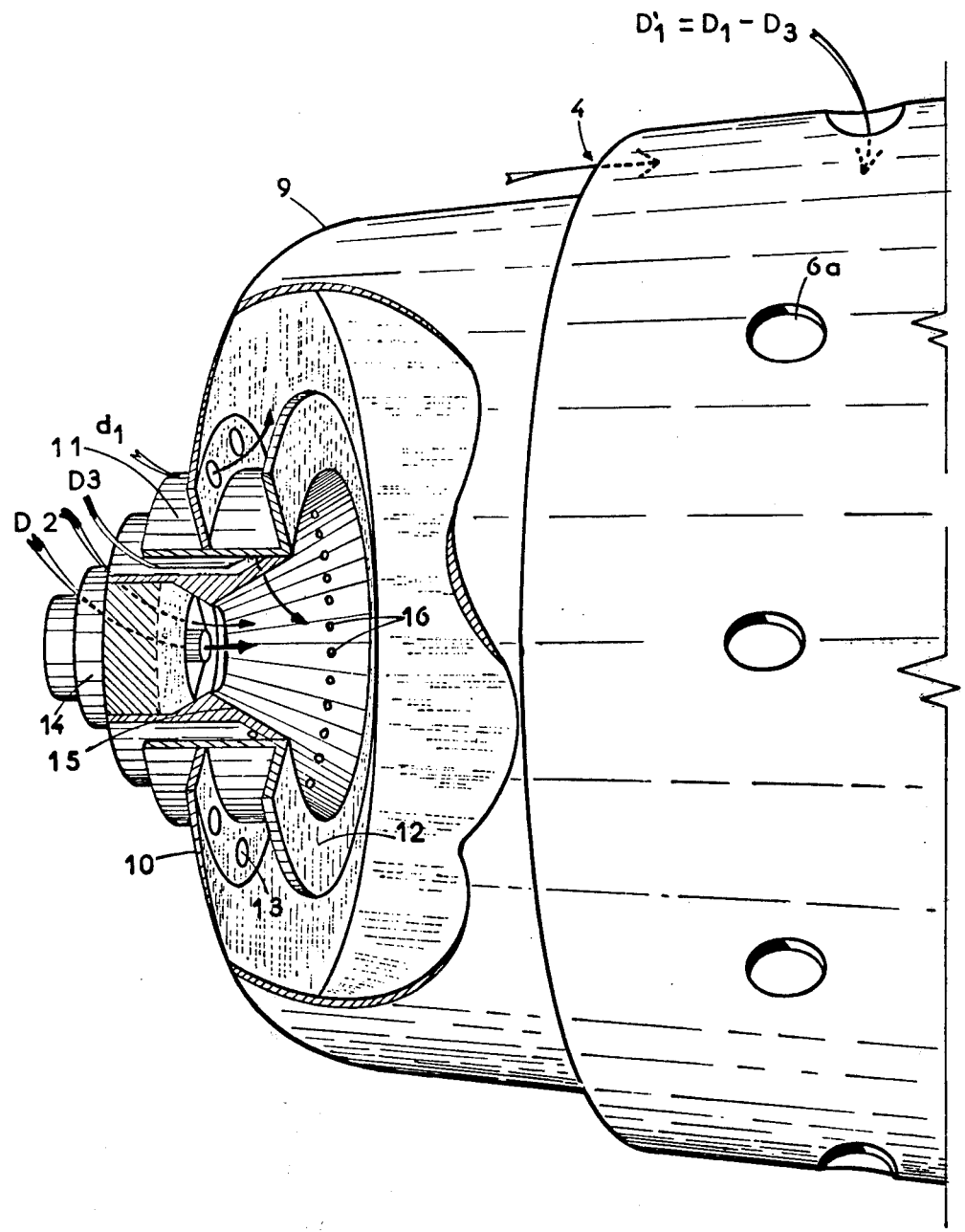
FIG. 3 is a perspective view, partly broken away, of the embodiment of FIG. 2 in showing the invention applied to a tubular type chamber.

All of the elements which are analogous to those of FIG. 2 are identified by the same references.

The intermediate segment for the case of a tubular chamber would here appear comprised of two truncated segments of cones 17, 18 with axes common with that of the injector. The holes 16 which are designed for the introduction of flow D3 are drilled immediately upstream of the joint of the two truncated cones, their diameter being between 1/10 and 1/40 of the maximum diameter of the truncated cone 17. The downstream portion 17 has an angle at the top greater than that of the upstream portion 18, for example, 90° and 60°, respectively. This configuration applies particularly to the case of annular or nozzle type chambers, for which each injector has its own intermediate segment.

In the case of an annular intermediate segment, each lateral wall is formed of two truncated cone sections, with the angle at the top increasing towards downstream, the holes 16 being drilled immediately upstream of the joint and being distributed in one or several planes perpendicular to the axis of the chamber. This application will be better understood by considering FIG. 6, as being representative of a section of this embodiment.

Figure 7:
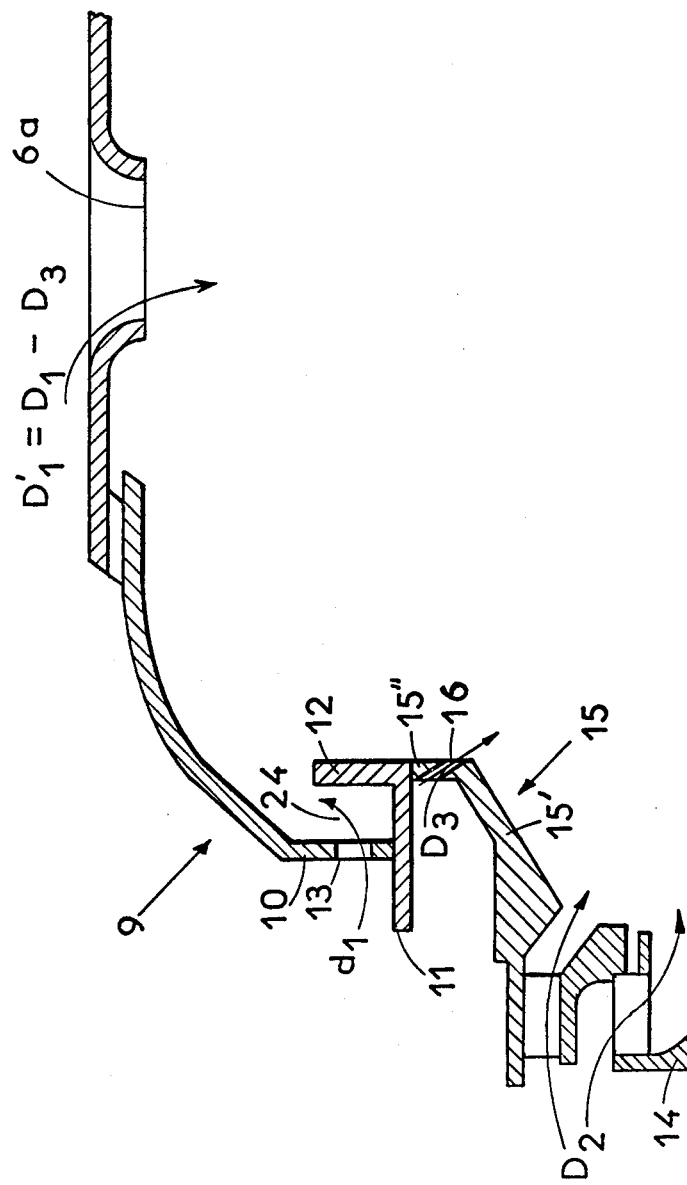
FIG. 7 is a view analogous to FIG. 2, showing a chamber modified in accordance with this invention, for which the intermediate segment of each injector is comprised of a first truncated shape to which a crown is joined, which is located in a plane perpendicular to the axis of the first portion.

Another manner of realizing the intermediate segment is illustrated in FIG. 7. The elements which are analogous to those of FIG. 2 being identified by the same references.

In this figure, the intermediate segment comprises a first truncated cone section 15', of which the angle at the top is between 60° and 100°, and an annular zone 15", which in this case is a crown, which is connected to the downstream end, which is flared from the former.

The injector 14 is attached to the upstream part of portion 15'.

The zone 15" is located in a plane perpendicular to the axis of the chamber and is connected to the downstream end of sleeve 11. On the other hand, it comprises, towards its downstream end, an annular plate 12, which cooperates with the base of the chamber 10 in order to form a space in which cooling air, flow D1, is introduced through orifices 13 which are drilled in the base of the chamber.

Holes 16, which allow the injection of flow D3 are drilled in segment 15" with their axes essentially perpendicular to the generator of the truncated cone portion 15'. It should be recalled that this flow D3 represents 1/6 to ⅓ of the primary air flow. In order to maintain a diameter of sleeve 11 which is identical to that which it had in FIG. 2, it is necessary to reduce the length, which is measured axially, of the truncated cone portion 15'.

This embodiment of the intermediate segment prevents the formation of possible hot spots behind the jets coming from holes 16, which, for chambers operating at high temperature and pressure, would entail a rapid destruction of the intermediate segment because of the considerable differences in temperature which would be created.

The arrangement which is described below applies to all cases of chambers for which each injector includes its own intermediate segment.

The application of the modification of the structure in the case of annular chambers for which the injectors are regrouped on a common annular intermediate segment in accordance with FIG. 5 is proximate by taking into consideration that, this time, FIG. 7 represents a section of the base of such a chamber.

In this case, the intermediate segment is comprised of an annular plane base, located in a plane perpendicular to the axis of the chamber, to which injectors are attached, of two truncated cone walls, which are connected to the base, which define a space, which flares as it goes downstream and, at the downstream end of which two crowns are located, each in a plane perpendicular to the axis of the chamber, in which holes 16 are drilled, allowing the injection of air flow D3. The outside truncated cone wall is connected, through the periphery of the crown which is associated with it, to a first sleeve, having at its downstream end an annular plate which is located in a plane perpendicular to the axis of the chamber and which cooperates with its base in order to form a space in which the cooling air is introduced, in the same manner, the inner truncated cone wall is connected to a second sleeve, also having an annular plate located in a plane perpendicular to the axis of the chamber and cooperating with its base in order to define a second space in which the cooling air is introduced. It is understood that the crown corresponding to the truncated cone portion with the greates dimension is attached to its downstream end by its smallest diameter and is attached to the corresponding sleeve by its greatest diameter, and vice versa for the crown which is attached to the inner truncated cone wall.

Figure 8:
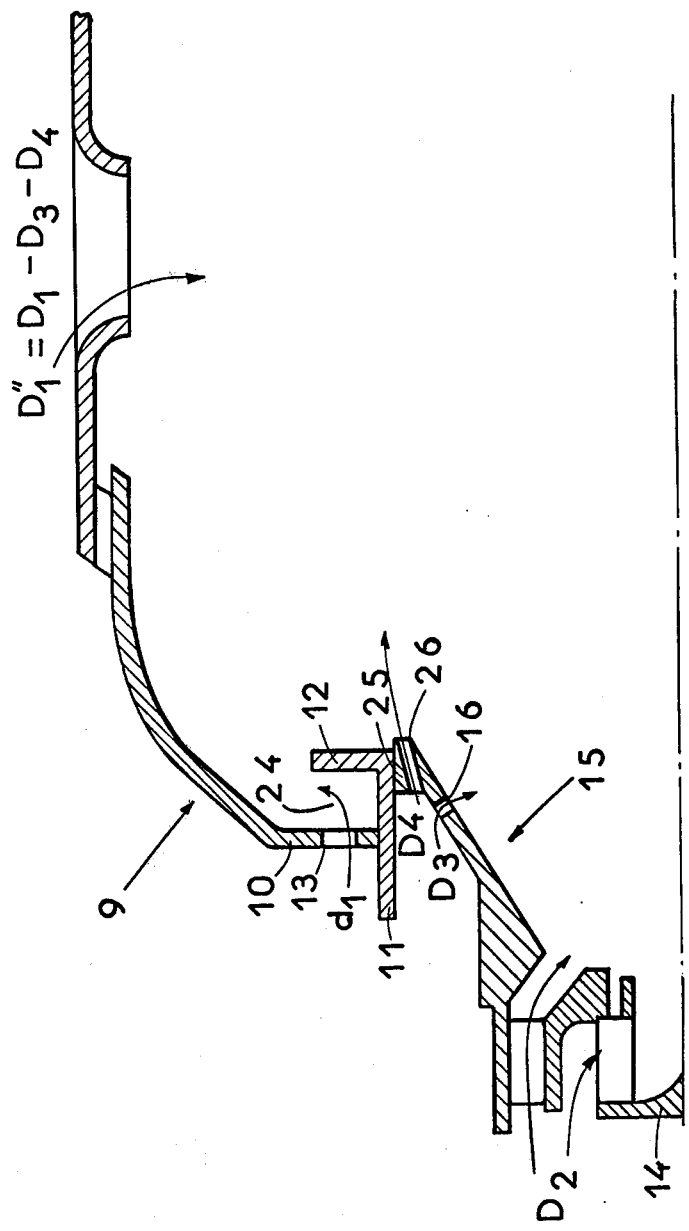
FIG. 8 is analogous to FIG. 2 and shows how cooling of the downstream ends of the intermediate segment can be realized in the case of the application of the invention to highly charged chambers.

FIG. 8 illustrates an improvement to the above arrangements, with respect to their appliccation to highly charged chambers.

In accordance with this improvement, orifices designed for the introduction of cooling air are drilled in the immediate proximity of the joint between the downstream end of the intermediate segment and the connecting sleeve at the base of the chamber.

Let us consider that FIG. 8 represents the base of a tubular type chamber.

The base of chamber 9 comprises an annular portion 10, located in a plane perpendicular to the axis of the chamber, to which a cylindrical sleeve is attached 11, which has an annular plate 12, cooperating with portion 10 in order to form an annular area 24 in which a cooling air flow D1 circulates, penetrating through holes 13 of portion 10 and then giving rise to a cooling film for the base of the chamber. The intermediate segment 15 is a truncated cone on the narrower portion of which an injector 14 of the aerodynamic type is mounted, assuring the atomization of the fuel due to an air flow D2. At its flared downstream end, the intermediate segment 15 is attached to the downstream end of sleeve 11, for example, by welding, and it is penetrated by holes 16, which allow the introduction of an air flow D3.

In accordance with this invention, the flared downstream end of the intermediate segment 15 (cone) is connected to sleeve 11 by the interposition of an annular element 25, which can be part of either the truncated cone 15 or sleeve 11, or it can also be a separate part. This annular element is drilled with small dimension holes 26 which allow the injection of an air flow D4, in the form of a large number of high speed jets, into the primary combustion zone. The orifices 26 are regularly distributed and are provided in such number that they allow the injection of an air flow D4, which represents 1/10 to 1/5 of the primary air flow. These jets thus assure a simultaneous cooling of the flared portion of the truncated cone 15 and of the downstream end of sleeve 11. These orifices 26 are preferably arranged in such a manner that they reduce the hot spillage which is caused by orifices 16.

The axes of orifice 26 are preferably substantially parallel to the plane which is tangent to the conic wall of the intermediate segment, or are inclined with respect to it at 10° at most; in the illustration they are additionally in a plane which contains the axis of the injector.

This arrangement permits the accentuation of the effects of flow D4 on the turbulence in the base of the chamber. It should be noted that the air jets which are thus formed penetrate the chamber in a direction which is divergent with respect to that of the axis of the injector, but maintaining a component parallel to that axis, particularly in a manner which will involve any fuel flowing on the walls of the intermediate segment towards the combustion zone. This thus allows a marked reduction of the emissions of unburnt hydrocarbons, which are generally inclined in the cooling films of the walls of the chamber.

Flow D4, which represents a fraction of the primary air, is, like flow D3, removed from the air which is injected transversely through holes 6 of FIG. 1b, in the primary combustion zone. The dimensions or the number of these holes are thus reduced as a consequence, in such a manner as to introduce through them only a flow $D''1$ so that $D''1 = D1 - D3 - D4$.

It is understood that the intermediate segment could also have a double slope in conformation with FIG. 6, the cooling openings 26 will also be drilled at the joint of the downstream end and the intermediate segment at the base of the chamber. In all these cases, the number of openings 26 is selected at least equal to that of the holes 16.

As far as the annular type chambers are concerned, each injector could be provided with its own truncated intermediate segment, the realization would, however, be identical to that at a tubular chamber at the level of each injector, the flow D4, which represents 1/10 to 1/5 of the primary air flow, being distributed over all of the intermediate segments; it is also possible to combine all of the cones into one single annular intermediate segment as it would appear in FIG. 5.

The description of the application, of the cooling process which is described above, to an annular chamber for which the intermediate segment is common to all injectors can be carried out in the manner shown in FIG. 8, by considering that this now represents the base of such a chamber (see FIG. 1a).

The intermediate segment is comprised of two coaxial, truncated cone lateral walls, which diverge from each other towards downstream. They are welded to an annular base which is located in a plane perpendicular to the axis of the chamber and equipped with the injectors (see FIG. 5).

The flared downstream end combines at the base of the chamber in the same manner as for a tubular chamber. The largest diameter truncated cone wall is attached to a first annular sleeve, having at its downstream end an annular plate which is located in a plane perpendicular to the axis of the chamber, cooperating with the base of the chamber in order to form a space in which the cooling air is introduced; the inner truncated cone wall is connected to a second sleeve, also having at its downstream end an annular plate which is located in a plane perpendicular to the axis of the chamber and, cooperating with the base of the chamber, in order to form a second annular space in which cooling air is introduced. For the application of the invention to this type of chamber, it is thus necessary to interpose between each lateral wall and the corresponding sleeve an annular segment belonging to one of these two elements, or independent, in which the orifices, such as 26, are located, allowing the injection of cooling air in the form of discrete jets. It is understood that these jets play the same role as in the case of tubular chambers and that the air flow D4, which is injected through them, represents 1/5 to 1/10 of the primary air flow.

In the same way, the axis of the holes will preferably be parallel to the plane which is tangent to the intermediate segment or inclined with respect to it at most 10°, they could be contained in an axial symmetry plane of the chamber.

A description of another improvement will be given with reference to FIGS. 9 and 10.

A first variation of this improvement will be described with reference to FIG. 9, by considering that it represents, in the first case, the base of a tubular chamber in a half cut through a plane of symmetry.

The base of the chamber 9 comprises an annular part 10, which is located in a plane perpendicular to the axis of the chamber, on which a cylindrical sleeve 11 is fastened, which has an annular plate 12, which is located in a plane perpendicular to the axis of the chamber, cooperating with part 10 in order to form an annular area 24 in which a flow $d_1$ of cooling air circulates, which enters through holes 13 of part 10, and then engendering a cooling film for the base of the chamber. Sleeve 11 is extended downstream of the plate 12 by a part 27 having the same diameter and being coaxial with it, and which extends over a length which is between 1/5 and half of its diameter.

The aerodynamic type injector 14 is attached to the chamber through a flared intermediate segment 15, here in the form of a truncated cone, penetrated by orifices 16, of which the characteristics and operation have already been described.

In accordance with the present improvement, the intermediate segment 15 is attached, by its flared downstream end, to the downstream end of part 27, thus resulting in a penetration of the intermediate segment 15 into the inside of the chamber to a depth between 1/5 of ½ of its maximum diameter. This arrangement allows the definition of a secondary annular recirculation zone 28, of which the volume is sufficient to assure a dwell time of the gases in combustion compatible with good performances of stability under conditions of low pressure and low temperature.

The preceding, which concerns chambers of the tubular type applies to all cases of chambers in which each injector has its own intermediate segment, but this can also be extended to the case of annular chambers in which the different intermediate segments have been combined into one single crown in accordance with FIG. 5.

It is recalled that, in this latter type of embodiment, the intermediate segment is formed of two truncated cone walls which diverge in the downstream direction and which are connected upstream to an annular plate which is located in a plane perpendicular to the axis of the chamber on which the injectors are mounted.

In accordance with the present improvement, each lateral wall is connected at the base of the combustion chamber by the interposition of a sleeve, comprising upstream to downstream, a first zone, limited by an annular plate which cooperates with the base of the chamber in order to form an annular space in which the cooling air is introduced through holes in the base of the chamber, and a second zone, extending downstream from the annular plate to a depth between 1/5 and half of the difference of the radii of the sleeves corresponding to each wall respectively. The embodiment will be better understood if reference is made to FIG. 9, by considering that it represents the base of an annular type chamber in which the intermediate segment is common to all injectors (see FIGS. 1a and 5).

Figure 10:
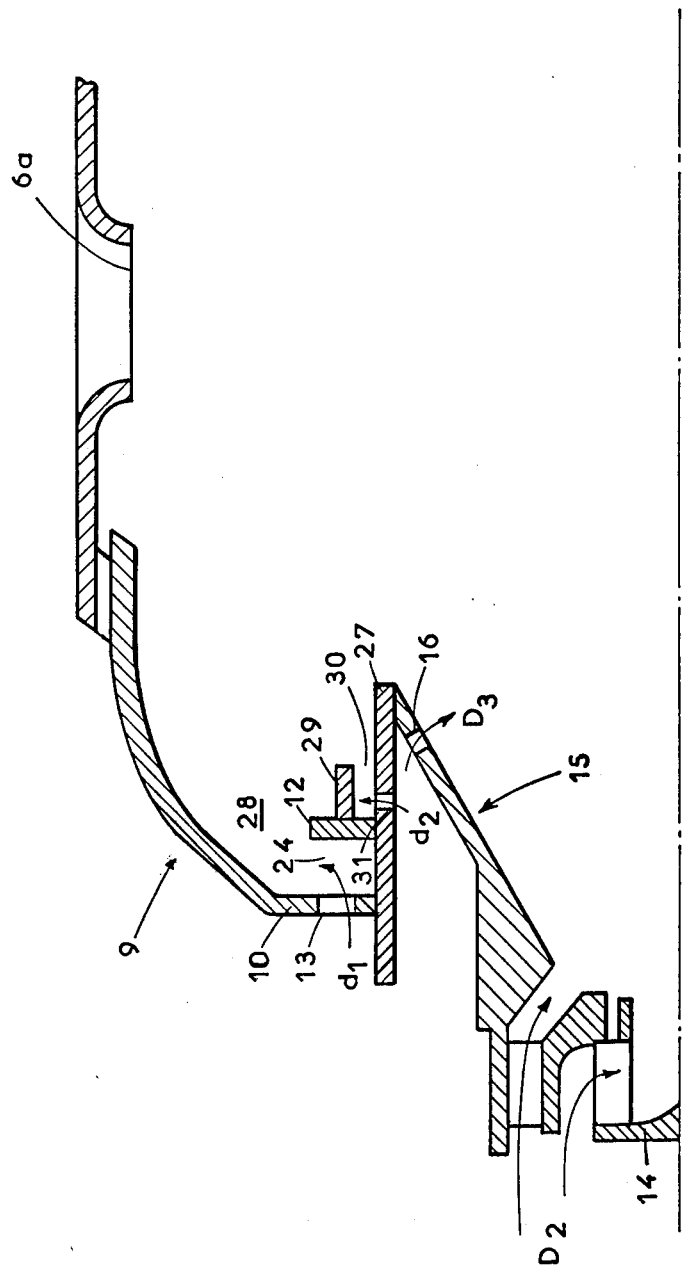
FIG. 10, which is analogous to FIG. 9, shows how the cooling of the downstream end of the intermediate segment can be realized.

A variation of this improvement is represented in FIG. 10. In its realization, this is identical to the above, but it furthermore comprises a cooling device for the downstream end of part 27 and of the intermediate segment 15, which penetrate into the chamber. The following is with reference to a tubular type chamber. A cylindrical mantle 29, which is coaxial with part 27, encloses it downstream of the annular plate 12, to which it is attached, for example, by welding.

The two sleeves 27 and 29 thus describe an annular space 30, in which a flow of air $d_2$ is introduced through orifices 31 in sleeve 27. The relative arrangement of sleeves 27 and 29 and the transverse injection of air into space 30 permit the formation of a cooling film for the downstream ends of the parts which penetrate into the chamber. A good cooling efficiency is obtained for an air flow $d_2$, representing 1/20 to 1/10 of the total air flow which is provided to the combustion chamber, this flow $d_2$ being removed from the primary air in such a manner as to maintain the adaptation at high operation. Beyond the cooling effect which is obtained, the air of the film thus created, which participates in the combustion, permits the inclusion of the fuel which could run over the walls of part 15 towards the combustion zone and also feeds the secondary recirculation zone 28. From this air injection, a better homogenization of the air/fuel mixture results, which improves the stability in zone 28.

In the case of an annular chamber, for which each injector is mounted on a conic intermediate segment, it is the entity of the air flows, such as $d_2$, which will represent 1/20 to 1/10 of the total air flow which is provided.

The adaptation of such a cooling device is also possible in the case where the intermediate segment is annular. For this, each sleeve for joining the lateral walls to the chamber is provided with an annular mantle extending downstream from the annular plates which are located in a plane perpendicular to the axis of the chamber, and welded to it. The orifices for the transverse introduction of air into the two coaxial annular spaces defined between each sleeve and its mantle are provided in each connecting sleeve at the level of the mantle. At the downstream end of each sleeve, a cooling film is thus formed. The number and the diameter of the orifices will be selected in such a manner that the cooling air which is introduced into the two annular spaces which are thus defined, represents 1/20 to 1/10 of the total air flow which is provided to the chamber.

Figure 9:
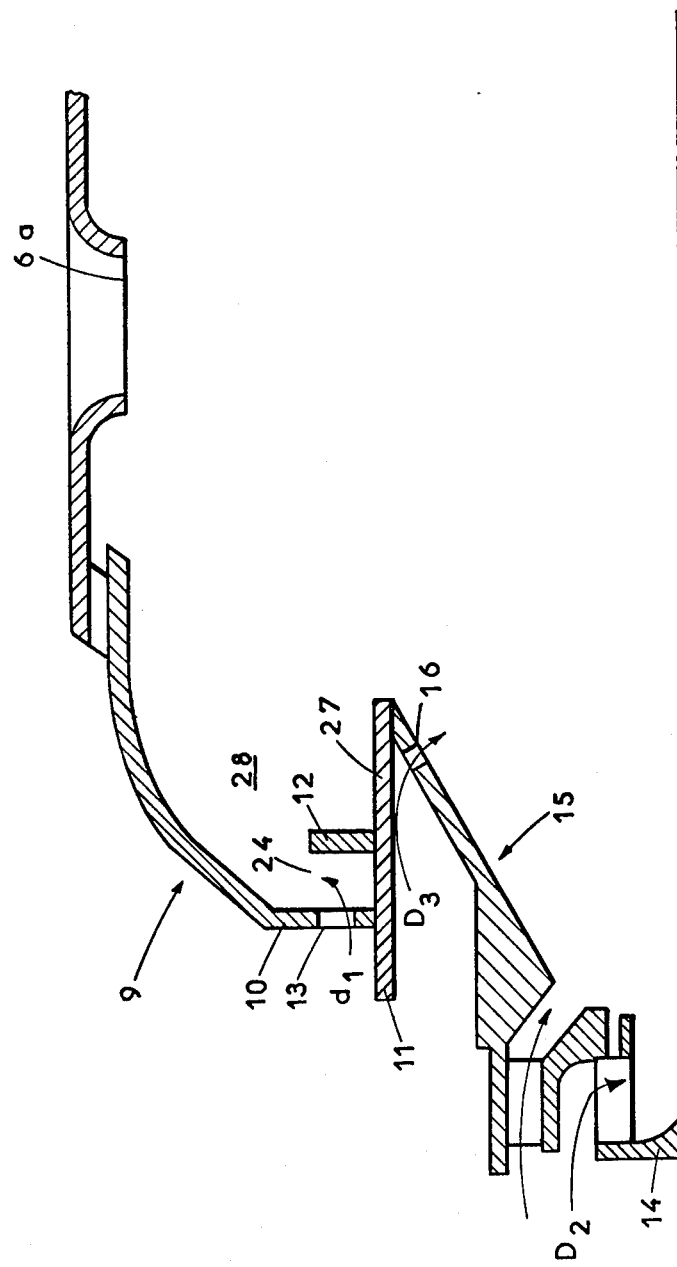
FIG. 9 shows how the penetration of the intermediate segment in the chamber can be realized in order to create a recirculation zone of considerable volume.

It is understood that the cooling device, which is described with reference to FIG. 8, would also be applicable to this case, and more particularly to the first variation (FIG. 9).

The intermediate segment could additionally be of the type described in FIG. 7, or could have a double slope in accordance with FIG. 6.

We claim:

1. In a combustion chamber for turbo engines, comprising a primary or combustion zone, provided with primary holes providing for the radial injection of a first air flow, a dilution and mixing zone, in which a second air flow is injected, and at least one injector of the pneumatic atomization prevaporization type, mounted on the base, with their axes parallel to that of the chamber means providing for the introduction of the fuel due to a third air flow, characterized in that between each injector and the base of the chamber which is located upstream of the primary zone, an intermediate segment is provided having dimensions which are reduced with respect to those of the chamber and defining a volume which flares in the direction of the gas flow and the walls of which are provided with a large number of small diameter holes, which are uniformly distributed, permitting the injection of a fourth flow of air in the form of jets which penetrate the carburized mixture from the injector, the first, third, and fourth air flows in total comprising the primary air which is necessary for the combustion reactions, this fourth flow of air representing 1/6 to ⅓ of the primary air, the third and fourth air flows which are adding being such that they form a stoichiometric mixture with the fuel which is injected at low operation in the intermediate zone; the first, third and fourth air flows which are added form, with the fuel, a stoichiometric mixture in the combustion zone during normal operation.

2. A combustion chamber in accordance with claim 1, characterized in that the first, third, and fourth air flows each represent ⅓ of the primary air.

3. A combustion chamber in accordance with claim 1 characterized in that the said intermediate segment is comprised, for each injector, of a truncated cone having the same axis as the injector, and of which the angle at the top has a value greater than 60°, and preferably near 100°, the small diameter holes permitting the injection of a fourth flow of air being distributed over at least one circle located in at least one plane perpendicular to the axis of the cone, in the proximity of its downstream end.

4. A combustion chamber in accordance with claim 1, characterized in that the said intermediate segment is formed, for each injector, of two truncated cones with connected axes, which are welded end to end, and of which the angles at the top increase in a downstream direction the small diameter holes permitting the injection of the fourth air flow, being located immediately upstream of the joint between the two truncated cones, and being distributed with a slight pitch on at least one circle which is located in at least one plane which is perpendicular to the common axis of the cones.

5. A combustion chamber in accordance with claim 1 characterized in that the intermediate segment is formed, for each injector, of a truncated cone having the same axis as the injector and an angle at the top having a value greater than 60° and preferably close to 100°, and of an annular zone connected to the periphery of the truncated zone, located in a plane perpendicular to the axis of the injector, in which small diameter holes are located, which are regularly distributed over at least one circle which is coaxial with the said zone, providing for the injection of a fourth air flow, the axis of each hole being essentially normal to the generator of the truncated cone segment.

6. A combustion chamber in accordance with claim 5, characterized in that the holes which are designed for the injection of the fourth air flow have a diameter between 1/40 and 1/10 of the maximum diameter of the intermediate segment.

7. A combustion chamber in accordance with claim 3, characterized in that the intermediate segment is connected to the base of the chamber through the interposition of a sleeve which is coaxial with it, and at the downstream end of which, it is solidified by the periphery of its downstream end, the said sleeve being provided at its downstream end with an annular plate, in a plane perpendicular to its axis and cooperates with the base of the chamber to form an annular space into which the cooling air is introduced through orifices located in the base of the chamber.

8. A combustion chamber in accordance with claim 3, characterized in that the maximum diameter of the downstream end of the intermediate segment of each injector is connected to the base of the chamber through the interposition of a cylindrical sleeve which comprises: a first part extending to an annular plate which is in a plane perpendicular to the axis of the chamber and defining with its base an annular space into which cooling air is introduced by orifices which are located in the base of the chamber, and a second portion extending downstream from the said annular plate, to a length between one-fifth and one-half of its diameter, the joint between the intermediate segment and the base of the chamber being at the downstream end of the said second part.

9. A combustion chamber in accordance with claim 8, characterized in that, around the second portion of the sleeve, which extends downstream from the annular plate, a coaxial, cylindrical mantle is arranged, which is solidly combined with the said annular plate, to define an annular space into which a quantity of air is transversely injected through orifices located in the sleeve, representing for the entity of the annular spaces which are thus defined, between 1/20 and 1/10 of the air flow which is provided to the chamber.

10. A combustion chamber, in accordance with claim 1, of the annular type, comprising a certain number of injectors which are distributed over its base, characterized in that the intermediate segment is annular and comprised of a circular base which is located in a plane perpendicular to the axis of the chamber, on which the injectors are fastened, and of two annular lateral walls, welded on the one hand to the circular base and on the other hand to the base of the chamber.

11. A combustion chamber in accordance with claim 10, characterized in that each lateral wall of the intermediate segment is of truncated cone shape, and has, at its downstream end, the holes which are designed for the injection for the fourth air flow and which are distributed over at least one circle which is located in at least one plane perpendicular to the axis of the chamber.

12. A combustion chamber in accordance with claim 10, characterized in that each lateral wall of the said intermediate segment is formed of two truncated cones, with combined axes, welded end to end, of which the angles at the top increase in the downstream direction, the small diameter holes which are designed for the injection of the fourth air flow being located immediately upstream of the joint between the two truncated cones, and distributed over at least one circle which is located in at least one plane perpendicular to the common axis of the truncated cone.

13. A combustion chamber in accordance with claim 10, characterized in that each lateral wall is formed of a truncated cone portion with an angle at the top between 60° and 100°, having at its downstream end an annular zone which is located in a plane perpendicular to the axis of the chamber, in which the small diameter holes are located, which are designed for the injection of the fourth air flow, these holes being distributed over at least one circle which is coaxial with the said zone and having its axial normal to the generator of the truncated cone portion, to which the annular zone is attached, where they are located.

14. A combustion chamber in accordance with claim 1, characterized in that the holes which are designed for the injection of the fourth air flow have a diameter between 1/10 and 1/40 of the maximum difference between the radii of the lateral walls, measured on a radius of the chamber itself.

15. A combustion chamber in accordance with claim 10, characterized in that each lateral wall is connected to the base of the chamber through a cylindrical sleeve, to the downstream end of which it is welded through the periphery of its downstream end; each sleeve being provided, at its downstream end, with an annular plate, which is located in a plane perpendicular to the axis of the chamber, which cooperates with its base in order to form an annular space into which cooling air is introduced by orifices located in the base of the chamber.

16. A combustion chamber in accordance with claim 10 characterized in that each lateral wall is connected to the base of the chamber through a cylindrical sleeve, at the downstream end of which it is welded through the periphery of its downstream end, each sleeve being formed of a first part which extends up to an annular plate which is included in a plane perpendicular to the axis of the chamber and which defines, with its base, an annular space, into which cooling air is introduced, and a second part extending downstream of the said annular plate to a length between one-fifth and one-half of the differences of the radii of the sleeves corresponding to each wall.

17. A combustion chamber in accordance with claim 16, characterized in that, coaxially with the second part, extending downstream of the annular plate, an annular mantle, which is made solid with the said plate, is arranged from each sleeve, to define an annular space into which a quantity of air, amounting to between 1/20 and 1/10 of the air flow provided to the chamber, is transversely injected through orifices which are located in the sleeve.

18. A combustion chamber in accordance with claim 1, characterized in that the small diameter holes which are regularly distributed are located in the proximity of the joint between the intermediate segment and the base of the combustion chamber in such a manner as to introduce a fifth flow of air which represents 1/10 to 1/5 of the primary air flow in the combustion zone, in the form of jets which penetrate at high speed, these orifices being in number at least equal to that of the holes which permit the injection of the fourth air flow.

19. A combustion chamber in accordance with claim 18 in which each injector has its own intermediate segment, characterized in that, at the joint between the maximum diameter downstream end of the intermediate segment and the base of the chamber, an annular element is disposed, in which small dimension orifices, which are designed for the injection of the fifth flow of air, are located, the axis of each orifice being parallel to a plane tangent to the conic portion of the intermediate segment.

20. A combustion chamber in accordance with claim 19 characterized in that the axis of each orifice, for the injection of the fifth air flow, is in a plane which includes the axis of the injector.

21. A combustion chamber in accordance with claim 18, of the annular type, for which the intermediate segment is annular, characterized in that, at the joint between the downstream end of each lateral wall and the base of the chamber, an annular element is disposed, in which the orifices are located, which permit the injection of the fifth flow of air, the axis of each of the orifices being parallel to a plane tangent to the truncated cone portion of the lateral wall.

22. A combustion chamber in accordance with claim 21, characterized in that the axis of each orifice is located in a plane which contains the axis of the chamber.

23. A combustion chamber in accordance with claim 18 in which each injector has its own intermediate segment, characterized in that, at the joint between the maximum diameter downstream end of the intermediate segment and the base of the chamber, an annular element is disposed, in which small dimension orifices, which are designed for the injection of the fifth flow of air, are located, the axis of each orifice making an angle of at most 10° with a plane tangent to the conic portion of the intermediate segment.

24. A combustion chamber in accordance with claim 18, of the annular type, for which the intermediate segment is annular, characterized in that, at the joint between the downstream end of each lateral wall and the base of the chamber, an annular element is disposed, in which the orifices are located, which permit the injection of the fifth flow of air, the axis of each of the orifices making an angle of at most 10° with a plane tangent to the truncated cone portion of the lateral wall.

* * * * *